(12) United States Patent
Thantharate et al.

(10) Patent No.: US 11,856,520 B2
(45) Date of Patent: *Dec. 26, 2023

(54) NETWORK-ASSISTED CHARGING PRIORITIZATION FOR CELLULAR UNMANNED AERIAL VEHICLES

(71) Applicant: T-MOBILE INNOVATIONS LLC, Overland Park, KS (US)

(72) Inventors: Anurag Thantharate, Overland Park, KS (US); Sreekar Marupaduga, Overland Park, KS (US); Sougata Saha, Olathe, KS (US); Atul Kulkarni, Brambleton, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,916

(22) Filed: Dec. 27, 2022

(65) Prior Publication Data
US 2023/0138594 A1    May 4, 2023

Related U.S. Application Data

(63) Continuation of application No. 17/151,826, filed on Jan. 19, 2021, now Pat. No. 11,611,937.

(51) Int. Cl.
*H04W 4/00* (2018.01)
*H04W 52/02* (2009.01)
*B64C 39/02* (2023.01)
*H04W 28/24* (2009.01)
(Continued)

(52) U.S. Cl.
CPC ....... *H04W 52/0261* (2013.01); *B64C 39/024* (2013.01); *H04W 28/0268* (2013.01);
(Continued)

(58) Field of Classification Search
CPC .............. B64U 50/34; H04W 28/0268; H04W 52/0229; H04W 52/0261
See application file for complete search history.

(56) References Cited

U.S. PATENT DOCUMENTS 9,948,380 B1    4/2018    Vos et al.
11,145,212 B2   10/2021   Dupray et al.
(Continued)

FOREIGN PATENT DOCUMENTS

EP      3809225 A1       4/2021
WO      WO-2021133451 A2 *  7/2021  ........... G08G 5/0013

*Primary Examiner* — Chi H Pham
*Assistant Examiner* — Elisabeth Benoit Magloire
(74) *Attorney, Agent, or Firm* — Shook, Hardy & Bacon L.L.P.

(57) ABSTRACT

Methods are provided for enabling network operators to play a key role in allowing Cellular Unmanned Aerial Vehicles (UAVs) to recharge batteries based on RF parameters and/or a class of service the UAVs provide to users/customers. For example, a particular mobile network operator (MNO) has a UAV charging station deployed in it leased towers where it has base stations (eNB/gNB) deployed. The MNO can provide charging as a service to the UAVs. When more than one drone is requesting a charge, the MNO can prioritize which UAV has the highest priority. In some aspects, the MNO can prioritize the UAVs for charging based on a Quality of Service identifier. Additionally or alternatively, the MNO can prioritize the UAVs for charging based on a Network Slice Selection Assistance Information indicator.

19 Claims, 4 Drawing Sheets

(51) Int. Cl.
*H04W 28/02* (2009.01)
*B64U 50/19* (2023.01)
*B64U 50/34* (2023.01)

(52) U.S. Cl.
CPC ....... *H04W 28/24* (2013.01); *H04W 52/0229* (2013.01); *B64U 50/19* (2023.01); *B64U 50/34* (2023.01)

(56) References Cited

U.S. PATENT DOCUMENTS

| | | |
|---|---|---|
| 2016/0039542 A1 | 2/2016 | Wang |
| 2018/0324662 A1* | 11/2018 | Phuyal ................. H04W 48/18 |
| 2019/0126769 A1 | 5/2019 | Schmalzried et al. |
| 2020/0090255 A1 | 3/2020 | Rodriguez Bravo et al. |
| 2020/0205211 A1* | 6/2020 | Hong ................... B64C 39/024 |
| 2020/0209892 A1 | 7/2020 | Luo et al. |
| 2020/0252847 A1 | 8/2020 | Park et al. |
| 2021/0039781 A1 | 2/2021 | Yao et al. |
| 2021/0080932 A1* | 3/2021 | Gorsica .................. H02J 50/10 |
| 2021/0080946 A1* | 3/2021 | Villa ............... G06Q 10/06312 |
| 2021/0103294 A1 | 4/2021 | Mahkonen et al. |
| 2021/0116941 A1 | 4/2021 | Lee et al. |
| 2021/0197983 A1 | 7/2021 | Wang et al. |
| 2021/0204207 A1 | 7/2021 | Fiorese et al. |
| 2021/0229566 A1* | 7/2021 | Hao ........................ B60L 53/67 |
| 2022/0007213 A1 | 1/2022 | Mokrushin et al. |
| 2022/0046528 A1 | 2/2022 | Yang et al. |
| 2022/0053584 A1 | 2/2022 | Xu et al. |
| 2022/0246025 A1* | 8/2022 | Parzysz ................. H04W 12/06 |
| 2022/0369363 A1* | 11/2022 | Ferdi .................... B64C 39/024 |
| 2022/0377545 A1* | 11/2022 | Wang ...................... H04W 4/44 |
| 2023/0024033 A1* | 1/2023 | Gaspardone ........... G06Q 50/30 |

* cited by examiner

NETWORK-ASSISTED CHARGING PRIORITIZATION FOR CELLULAR UNMANNED AERIAL VEHICLES

CROSS-REFERENCE TO RELATED APPLICATIONS

This application is a continuation of U.S. patent application Ser. No. 17/151,826, filed Jan. 19, 2021, and entitled network-assisted charging prioritization cellular unmanned aerial vehicles, the entirety of which is hereby incorporated by reference.

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, aspects are provided for enabling network operators to play a key role in allowing Cellular Unmanned Aerial Vehicles (UAVs) to recharge batteries based on RF parameters and/or a class of service the UAVs provide to users/customers. For example, a particular mobile network operator (MNO) may have a UAV charging station deployed in it leased towers where it has base stations (eNB/gNB) deployed. The MNO can provide charging as a service to the UAVs. When more than one drone is requesting a charge, the MNO can prioritize which UAV has the highest priority.

In some aspects, the MNO can prioritize the UAVs for charging based on a Quality of Service (QoS) identifier. Additionally or alternatively, the MNO can prioritize the UAVs for charging based on a Network Slice Selection Assistance Information (NSSAI) indicator.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
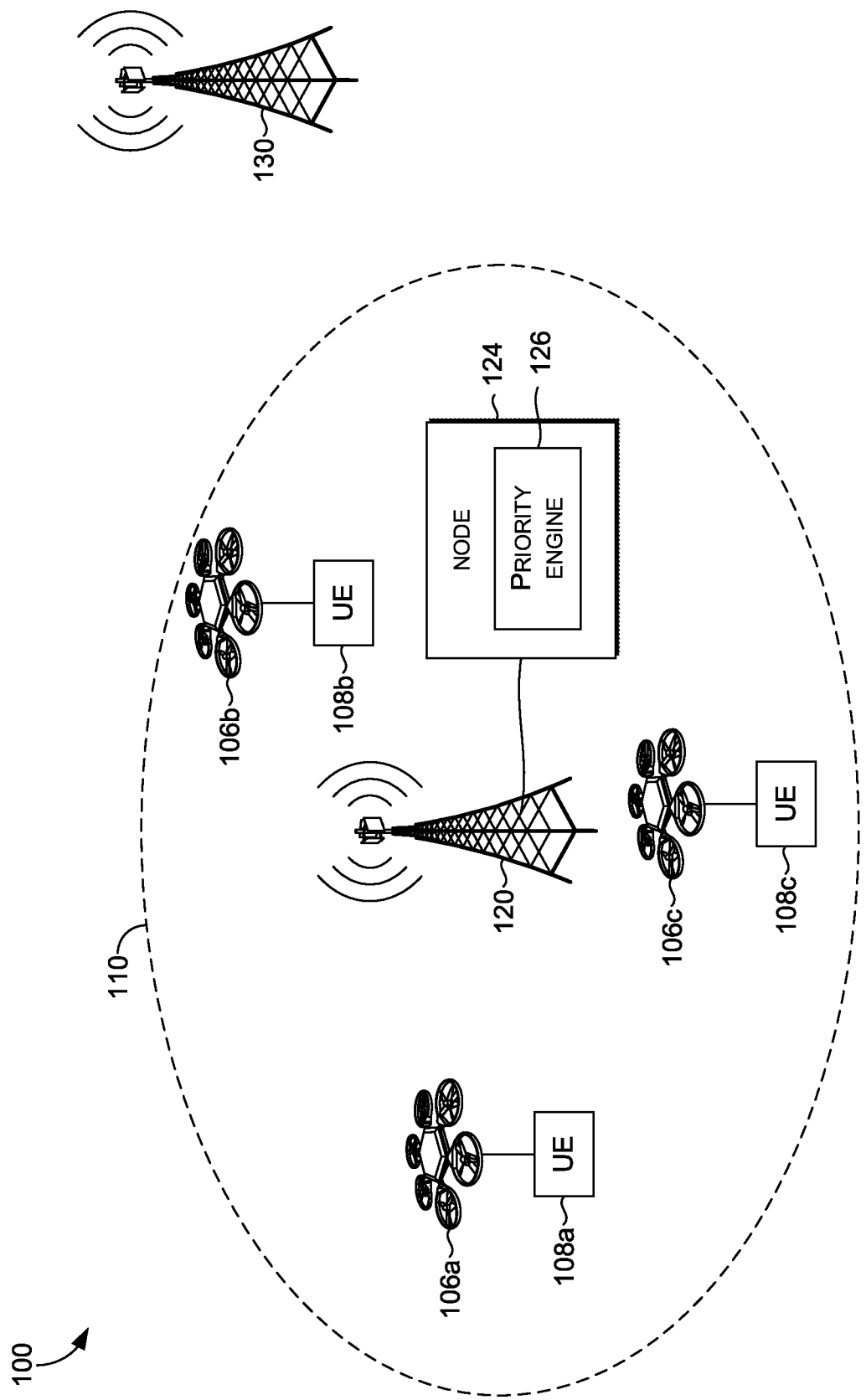
FIG. 1 depicts an example of a network environment in accordance with one or more embodiments.

The subject matter of select embodiments of aspects herein is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which can be used to store the desired information and which may be accessed by the computing device 500 shown in FIG. 5. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Quality of service (QoS) refers to the measurement of the overall performance of a service experienced by the users of a network. A QoS flow enables network policy and charging to be enforced for various user types or applications. In this way, the network can enforce different prioritization levels for different user types and/or applications. For example, the QoS flow may define priorities between normal users and critical users, between critical users and critical organization, between different types of information (e.g., voice, signaling, data), guarantee emergency calls are served, or guarantee services are available during disasters or extreme conditions.

Network slicing allows MNOs to provide multiple virtual networks over the same physical mobile network that mimics the same or better expected network performance as the replaced dedicated network in terms of capacity, speed, latency, and availability. A slice/service type (SST) refers to the expected network slice behavior in terms of features and services. A slice differentiator (SD) is optional information that complements the slice/service type(s) to differentiate amongst multiple network slices of the same slice/service type.

A UE that has a NSSAI indicator indicates the UE may access multiple network slices in the same access network. A UAV that has a NSSAI indicator indicates the UAV may serve as a UE relay or base station that provides multiple virtual networks to UEs with an NSSAI indicator in the same access network.

The UAV industry is growing rapidly. Both UAV as a UE relay and UAV a as base station will play significant roles in smart cities of the future. For example, UAVs can provide cellular coverage enhancement during events like natural disasters or for public mission critical service. UAVs can also offer other significant economic benefits to mobile network operators.

Cellular UAVs are typically designed with compact bodies and are light weight. This design restricts drone manufacturers from putting heavy batteries, heavy rotors, big cameras, and traditional cellular systems (base station and relay elements) onto drones. As weight is added to a UAV, more power is required to perform its operation. Consequently, the low battery life of conventional UAVs means the drones need to be recharged or have their battery manually replaced every twenty to thirty minutes. This dramatically limits the flight range and running time of the drones, and as a result, the drones are unable to meet their full potential in the cellular space.

Aspects herein enable network operators to play a key role in allowing UAVs to recharge batteries based on RF parameters and/or a class of service the UAVs provide to users/customers. Consider a particular MNO has a UAV charging station deployed in it leased towers where it has based stations (eNB/gNB) deployed. The cellular drones are registered UEs and the MNO can provide charging as a service to the UAVs. This enables the UAV users to recharge batteries for drones in range of a particular MNO so the drones can provide reliable and consistent coverage.

When more than one drone is requesting a charge, the MNO can prioritize which UAV has the highest priority. In some aspects, the MNO can prioritize the UAVs for charging based on a QoS identifier (e.g., QCI for LTE or 5QI for 5G NR). Additionally or alternatively, the MNO can prioritize the UAVs for charging based on an NSSAI indicator.

In one aspect, computer-readable storage media having computer-executable instructions embodied thereon is provided that, when executed by one or more processors, cause the processors to perform a method. The method comprises receiving, at a base station, a request from a cellular unmanned aerial vehicle (UAV) indicating the UAV needs to recharge a battery. The method also comprises determining, at the base station, a priority for the UAV. The method further comprises communicating, by the base station, charging instructions to the UAV.

In another aspect, a method for providing network-assisted charging prioritization for cellular unmanned aerial vehicles (UAVs) is provided. The method comprises receiving, at a base station, a request from a UAV indicating the UAV needs to recharge a battery. The request comprises a quality of service (QoS) identifier corresponding to the UAV. The method also comprises determining, at the base station, a priority for the UAV. The priority is based on the QoS identifier corresponding to the UAV. The method further comprises communicating, by the base station, charging instructions to the UAV.

In yet another aspect, a system is provided for providing network-assisted charging prioritization for cellular unmanned aerial vehicles (UAVs). The system comprises a cell site comprising a plurality of antennas and at least one charging station. The cell site receives a request from a UAV indicating the UAV needs to recharge a battery. The cell cite also determines a priority for the UAV. The priority is based on network slice selection assistance information (NSSAI) support corresponding to the UAV. The cell site further communicates charging instructions to the UAV.

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network (not shown) that provides service to UEs. The network may be accessible through cell site 120, which includes several components, including a base station and a charging station. The base station and/or a computing device (e.g., whether local or remote) associated with the base station may manage or otherwise control the operations of components of a cell site, including an antenna array located within cell site 120. The base station and/or the computing device associated with the base station may include one or more processors and computer-readable storage media having computer-executable instructions or computer instruction modules embodied thereon for execution by one or more processors.

The antenna array associated with cell site 120 may radiate in a particular direction and thus may correspond to a particular sector of a cell site. The antenna array may have a plurality of antenna elements, in embodiments. In one embodiment, the antenna array is configured to have a plurality of elements that in number, arrangement, and/or density, are configured for mMIMO. In one such embodiment, the base station may include a radio and/or a controller, such as a Massive Multiple-Input Multiple-Output Unit (MMU) for controlling a mMIMO configured antenna array. The base station may use the controller to monitor one or more network operation parameters, including throughput, signal quality metrics (e.g., SINR), a quantity of unique users/subscribers, etc.

As shown in FIG. 1, cell site 120 includes one or more nodes, which could be an Evolved Node B (i.e., "eNodeB" or "eNB") or a Next Generation Node B (i.e., "gNodeB" or "gNB"). One or more UEs 108a-108c may be operating UAVs 106a-106c to provide cellular coverage enhancement for coverage area 110 provided by the one or more nodes.

In embodiments, each of the UAVs 106a-106c may be providing similar or different types of coverage. For example, UAV 106a may be deployed for conversational live video streaming. UAV 106b may be deployed for real-time gaming and vehicle-to-everything (V2X) messages. In this example, each of UAV 106a and UAV 106b are deployed for recreational services. Meanwhile, UAV 106c may be deployed for mission-critical/emergency services. Moreover, each UAV may be operating at various altitudes and/or distances from cell site 120.

Continuing this example, as each drone 106a-106c continues to operates, the battery of one or more of the UAVs 106a-106c may need to be recharged in order to continue providing service, or sustain flight. As a user of a UE 108a-108c operating a corresponding UAVs 106a-106c determines a battery charge is needed, or a battery level of a UAV 106a-106c operating autonomously reaches a critical level, a request is provided to the node 124. The request may be initiated by the user of the UE 108a-108c operating the corresponding UAV 106a-106c or may be automatically initiated by the UAV 106a-106c. In each case, the actual request is communicated by UAV106a-106c to the node 124.

In embodiments, the request may include a QoS identifier. The QoS identifier indicates the type of service the UAV is providing. Using the QoS identifier, priority component 126 determines a priority for the UAV 106a-106c making the request. As can be appreciated, in a situation where multiple requests are received, it is necessary to prioritize which UAV should have its battery charged first.

In the example above, since UAV 106c is providing mission-critical/emergency services, priority engine 126 may determine it has charging priority over UAV 106a or UAV 106b when a request is received from UAV 106c and UAV106a and/or 106b. Similarly, since UAV 106b is providing real-time gaming and V2X messages and UAV 106a is providing conversational live video streaming, priority engine 126 may determine UAV 106b has charging priority over UAV 106a. In some embodiments, the node 124 may have access, based on the corresponding network service provider, to a look up table that the priority engine 126 can utilize to determine the appropriate priority.

In some embodiments, the request may include a NSSAI indicator or a NSSAI bit Information Element (IE) indicating the UAV has NSSAI support. If priority engine 126 determines the UAV has NSSAI support, the UAV with NSSAI support is prioritized for charging over a UAV without NSSAI support. For example, if UAV 106a and UAV 106b are each providing conversational live video streaming, but UAV 106a has NSSAI support and UAV 106b does not, priority engine 126 prioritizes UAV 106a for charging over UAV 106b.

In some embodiments, the request further comprises a battery level of the battery. Based on priority engine 126 determining that two or more UAVs have similar priorities, the priority engine 126 prioritizes the UAV with the least remaining charge. Priority engine 126 may additionally communicate charging instructions that include a particular amount of charging time. For example, if more than one UAV has a low battery level, the priority engine 126 may determine the amount of charging time each UAV is entitle to so each UAV is able to sustain operational minutes without the battery dying.

Once the priority engine 126 determines the priority for the UAV, charging instructions are communicated to the UAV. In various embodiments, the charging instructions comprise instructions to recharge the battery at a UAV charging station of the cell site, wait for a period of time before recharging the battery at the UAV charging station of the cell site, communicate the request to a neighboring cell site (such as cell site 130), and/or change altitude or distance to conserve battery power.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
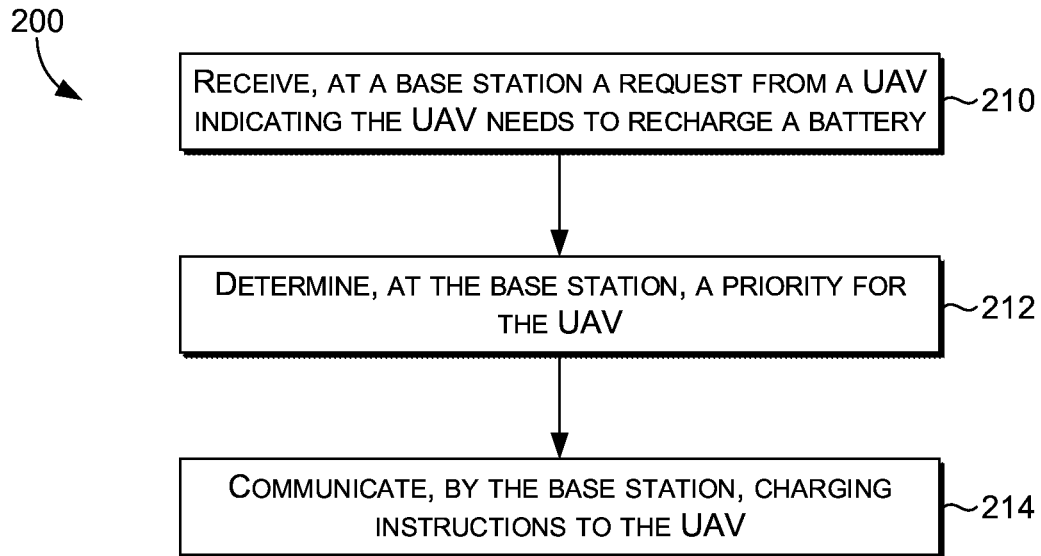
FIG. 2 depicts a flowchart of an exemplary method for prioritizing UAVs for charging, in accordance with aspects herein, in accordance with aspects herein.

FIG. 2 depicts a flowchart of an exemplary method 200 for method for prioritizing UAVs for charging, in accordance with aspects herein. At block 210, a request is received, at a base station, from a cellular unmanned aerial vehicle (UAV) indicating the UAV needs to recharge a battery.

At block 212, a priority is determined, at the base station for the UAV. At block 214, charging instructions are communicated, by the base station, to the UAV. In some aspects, the request comprises a battery level of the battery corresponding to the UAV. Based on the comparing, determining that two or more UAVs have similar priorities and prioritizing the UAV of the two or more UAVs with the least remaining charge. In some aspects, the charging instructions comprise an amount of charging time so the UAV can sustain operational minutes without the battery dying.

In some aspects, the request comprises a quality of service (QoS) identifier corresponding to the UAV. The QoS identifier is compared to QoS identifiers of other UAVs that have communicated a recharge request to the base station. Based on the comparing, determining the charging instructions for the UAV.

In some aspects, it is determined the UAV has network slice selection assistance information (NSSAI) support. The UAV with NSSAI support is prioritized over a UAV without NSSAI support.

In various aspects, the charging instructions comprise instructions to recharge the battery at a UAV charging station of the base station, wait for a period of time before recharging the battery at the UAV charging station of the base station, communicate the request to a neighboring base station, and/or change altitude or distance to conserve battery power.

Figure 3:
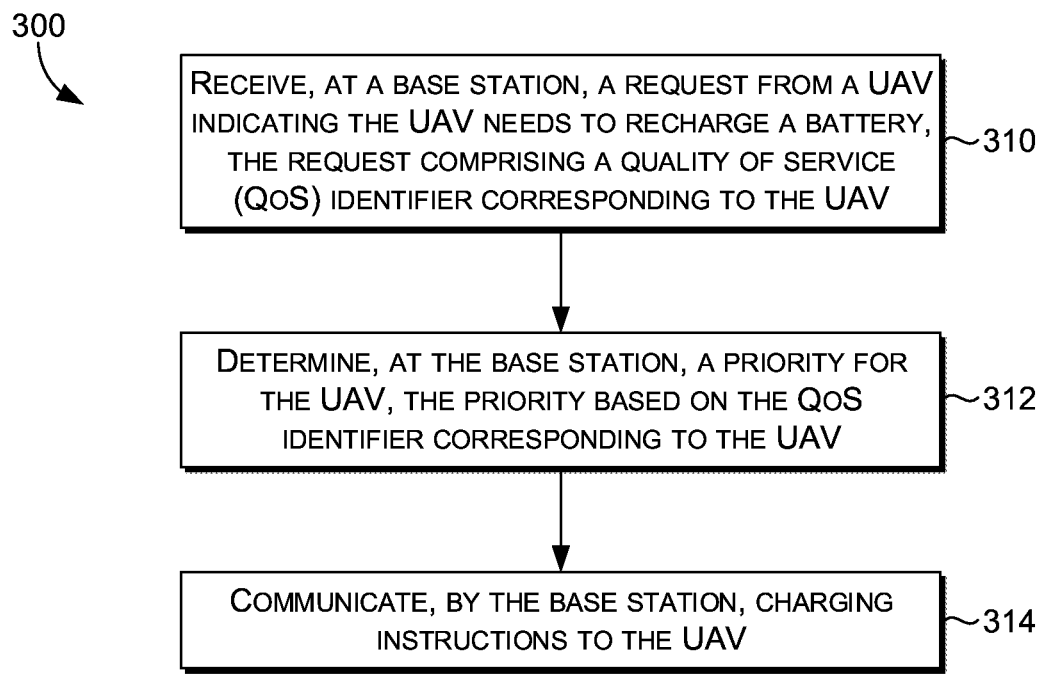
FIG. 3 depicts a flowchart of an exemplary method for prioritizing UAVs for charging based on a QoS identifier, in accordance with aspects herein, in accordance with aspects herein.

FIG. 3 depicts a flowchart of an exemplary method 300 for prioritizing UAVs for charging based on a QoS identifier, in accordance with aspects herein. At block 310, a request is received, at a base station, from a UAV. The request indicates the UAV needs to recharge a battery. The request comprises a quality of service (QoS) identifier corresponding to the UAV.

At block 312, the base station determines a priority for the UAV. The priority is based on the QoS identifier corresponding to the UAV. The base station communicates, at block 314, charging instructions to the UAV.

In some aspects, the QoS identifier is compared to QoS identifiers of other UAVs that have communicated a recharge request to the base station. Based on the comparison, the base station determines charging instructions for the UAV.

In some aspects, the request further comprises a battery level of the battery. Based on the comparing, determining that two or more UAVs have similar priorities and prioritizing the UAV of the two or more UAVs with the least remaining charge. In some aspects, the charging instructions comprise an amount of charging time so the UAV can sustain operational minutes without the battery dying.

In some aspects, it is determined the UAV has network slice selection assistance information (NSSAI) support. The UAV with NSSAI support is prioritized over a UAV without NSSAI support.

Figure 4:
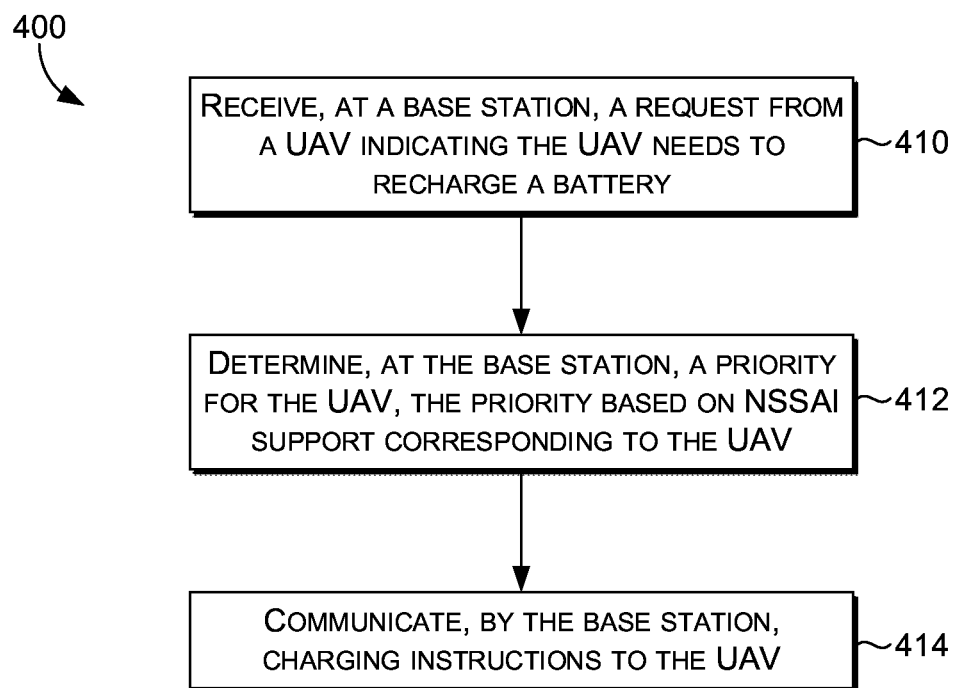
FIG. 4 depicts a flowchart of an exemplary method for prioritizing UAVs for charging based on NSSAI support, in accordance with aspects herein.

FIG. 4 depicts a flowchart of an exemplary method 400 for prioritizing UAVs for charging based on NSSAI support, in accordance with aspects herein. At block 410, a request is received from a UAV indicating the UAV needs to recharge a battery. A priority is determined for the UAV, at block 412. The priority is based on network slice selection assistance information (NSSAI) support corresponding to the UAV. At block 414, charging instructions are communicated to the UAV.

In aspects, the UAV with NSSAI support is prioritized over a UAV without NSSAI support. In some aspects, a QoS identifier of the UAV may be compared to QoS identifiers of other UAVs that have communicated a recharge request to the base station. The charging instructions for the UAV may be based on the comparison.

Figure 5:
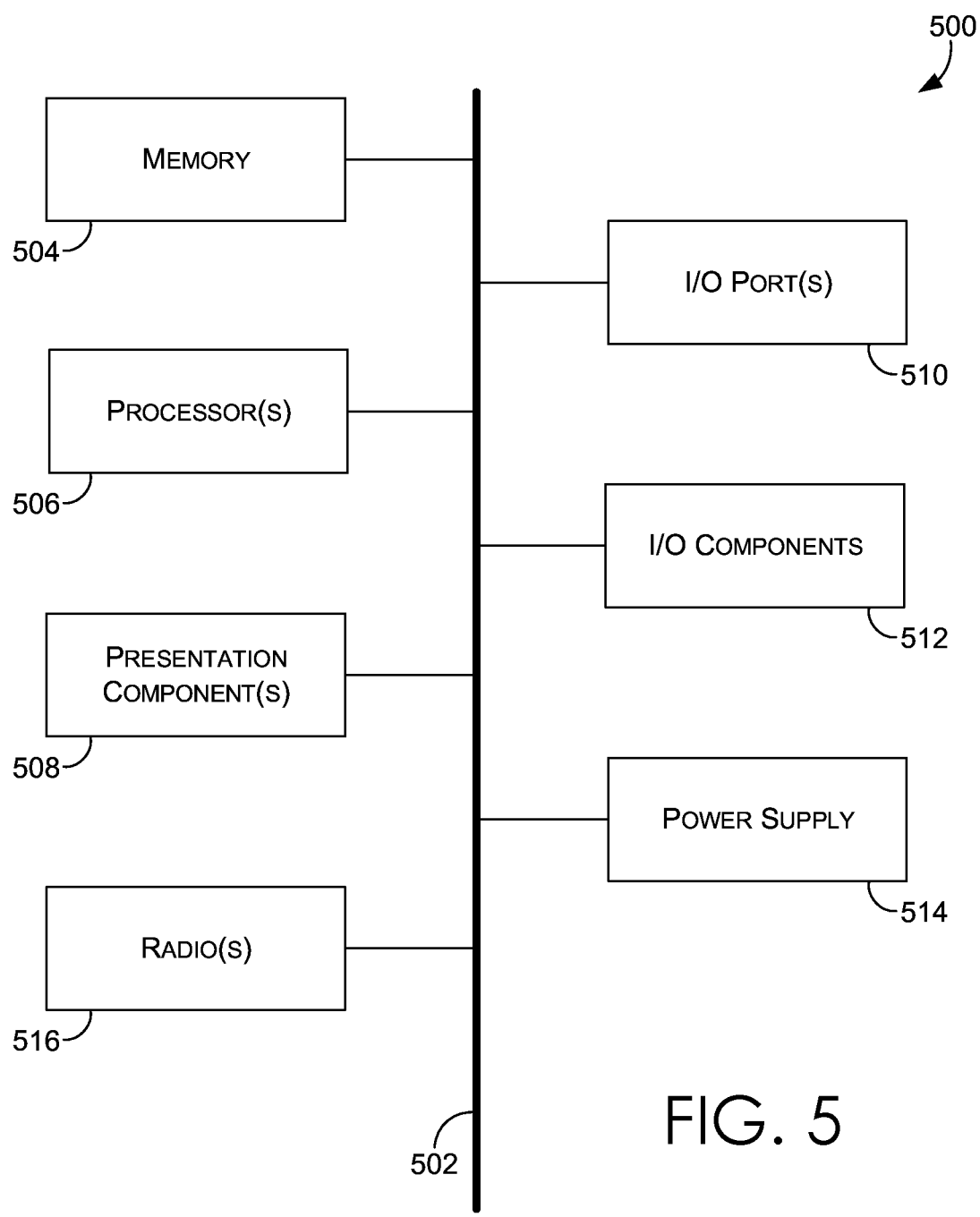
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunications network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 can be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable storage media having computer-executable instructions embodied thereon that, when executed by one or more processors, cause the processors to:
receive, at a base station, a request from a cellular unmanned aerial vehicle (UAV) corresponding to a first quality of service (QoS) identifier and indicating the UAV needs to recharge a battery;
compare, at the base station, the first QoS identifier to QoS identifiers of other UAVs that have communicated a recharge request to the base station
determine a priority for the UAV; and
communicate, by the base station, charging instructions to the UAV.

2. The media of claim 1, wherein the QoS refers to the measurement of the overall performance of a service experienced by users of a network.

3. The media of claim 1, wherein the QoS flow defines priorities between normal users, critical users, and critical organizations.

4. The media of claim 1, wherein the QoS flow defines priorities between different types of information including voice, signaling, and data, guarantee emergency calls are served, or guarantee services are available during disasters or extreme conditions.

5. The media of claim 1, wherein QoS identifiers are QoS Class Identifier (QCI) for Long Term Evolution (LTE) or Fifth Generation (5G) QoS Identifier (5QI) for Fifth Generation (5G) New Radio (NR).

6. The media of claim 1, wherein the QoS identifier indicates the type of service the UAV is providing.

7. The media of claim 1, wherein the request further comprises a battery level of the battery.

8. The media of claim 7, wherein based on the comparing, determining that two or more UAVs have similar priorities and prioritizing the UAV of the two or more UAVs with the least remaining charge.

9. The media of claim 1, wherein the charging instructions comprise an amount of charging time enabling the UAV to sustain operational minutes without the battery dying.

10. The media of claim 1, wherein the charging instructions comprise instructions to recharge the battery at a UAV charging station of the base station, wait for a period of time before recharging the battery at the UAV charging station of the base station, communicate the request to a neighboring base station, change altitude or distance to conserve battery power.

11. A method for providing network-assisted charging prioritization for cellular unmanned aerial vehicles (UAVs), the method comprising:
receiving, at a base station, a request from a UAV indicating the UAV needs to recharge a battery, the request comprising a quality of service (QoS) identifier corresponding to the UAV;
comparing the QoS identifier to QoS identifiers of other UAVs that have communicated a recharge request to the base station;
determining, at the base station, a priority for the UAV, the priority based on the QoS identifier corresponding to the UAV; and
communicating, by the base station, charging instructions to the UAV.

12. The method of claim 11, wherein the request further comprises a battery level of the battery.

13. The method of claim 12, wherein the charging instructions comprise an amount of charging time enabling the UAV to sustain operational minutes without the battery dying.

14. The method of claim 11, wherein based on the comparing, determining that two or more UAVs have similar priorities and prioritizing the UAV of the two or more UAVs with the least remaining charge.

15. The method of claim 11, further comprising determining the UAV has network slice selection assistance information (NSSAI) support.

16. The method of claim 15, further comprising prioritizing the UAV with NSSAI support over a UAV without NSSAI support.

17. A system for providing network-assisted charging prioritization for cellular unmanned aerial vehicles (UAVs), the system comprising:
a cell site comprising a plurality of antennas and at least one charging station, the cell site:

receiving a request from a UAV with a QoS identifier indicating the UAV needs to recharge a battery;

determining a priority for the UAV, the priority based on comparing the QoS identifier to QoS identifiers of other UAVs that have communicated a recharge request; and communicating charging instructions to the UAV.

18. The system of claim 17, further comprising prioritizing the UAV with NSSAI support over a UAV without NSSAI support.

19. The system of claim 17, further comprising:

comparing a QoS identifier of the UAV to QoS identifiers of other UAVs that have communicated a recharge request to the base station; and based on the comparing, determining the charging instructions for the UAV.

* * * * *